United States Patent [19]

Cooper et al.

[11] Patent Number: 4,542,407
[45] Date of Patent: Sep. 17, 1985

[54] METHOD AND APPARATUS FOR SCRAMBLING AND DESCRAMBLING TELEVISION PROGRAMS

[75] Inventors: Jeffrey L. Cooper; Brian C. Johnson, both of Syracuse, N.Y.

[73] Assignee: North American Philips Corporation, New York, N.Y.

[21] Appl. No.: 503,208

[22] Filed: Jun. 10, 1983

[51] Int. Cl.[4] .............................................. H04N 7/16
[52] U.S. Cl. ..................................... 358/120; 358/122
[58] Field of Search ................ 358/118, 120, 122, 114

[56] References Cited

U.S. PATENT DOCUMENTS

| | | | |
|---|---|---|---|
| 2,892,882 | 6/1959 | Hughes | 358/120 |
| 4,292,650 | 9/1981 | Hendrickson | 358/122 |
| 4,390,899 | 6/1983 | Osaka et al. | 358/120 |
| 4,398,215 | 8/1983 | Osaka | 358/120 |
| 4,466,017 | 8/1984 | Banker | 358/120 |

Primary Examiner—S. C. Buczinski
Assistant Examiner—Linda J. Wallace
Attorney, Agent, or Firm—Thomas A. Briody; William J. Streeter; Edward W. Goodman

[57] ABSTRACT

A method for scrambling and descrambling television programs in which the horizontal synchronizing information is suppressed at a CATV supplier's head-end and then regenerated at the subscriber's converter. The pulse frequency is multiplied by a factor N/M, in which N and M are integers thereby generating a synthesized pulse stream which is, in turn, encoded with data identifying the values for N and M. This encoded pulse stream is modulated onto the audio subcarrier wave in the TV video signal and transmitted to the converter. The converter then demodulates and recovers the encoded pulse stream, decodes the same to recover the identifying data, using this data to obtain the correct values for N and M which have been transmitted separately on a digital data channel. The converter then multiplies the synthesized pulse stream by M/N regenerating the horizontal synchronizing pulse stream and inserts the same into the TV video signal at the proper phase.

20 Claims, 13 Drawing Figures

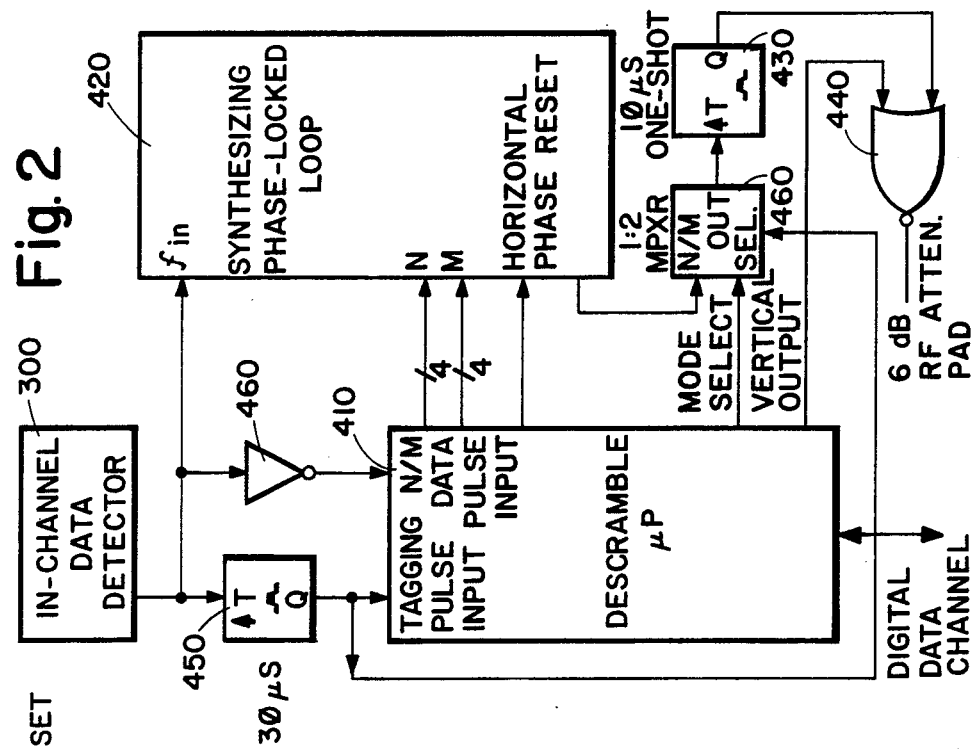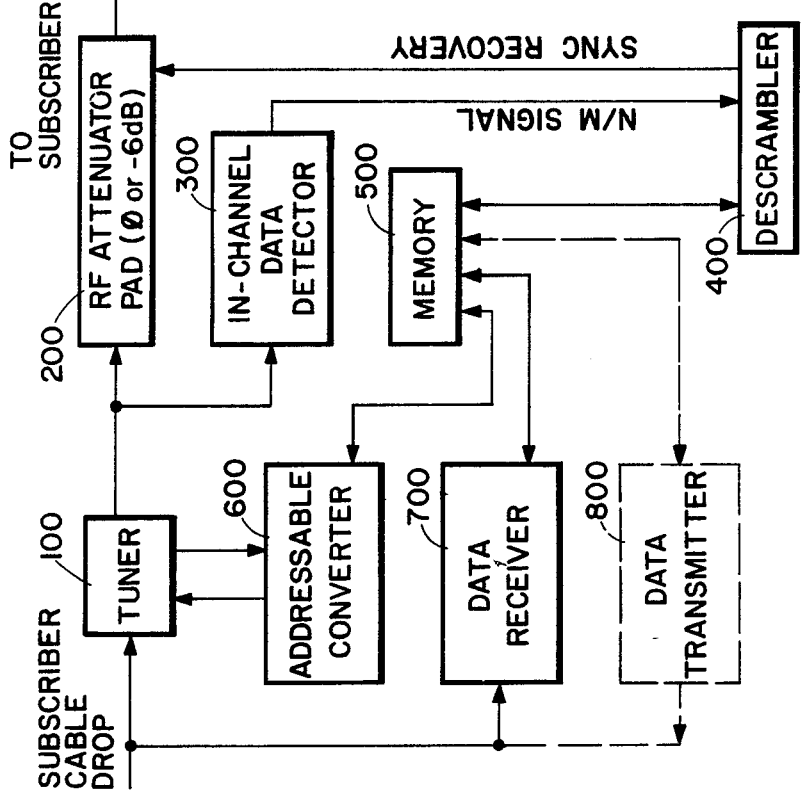

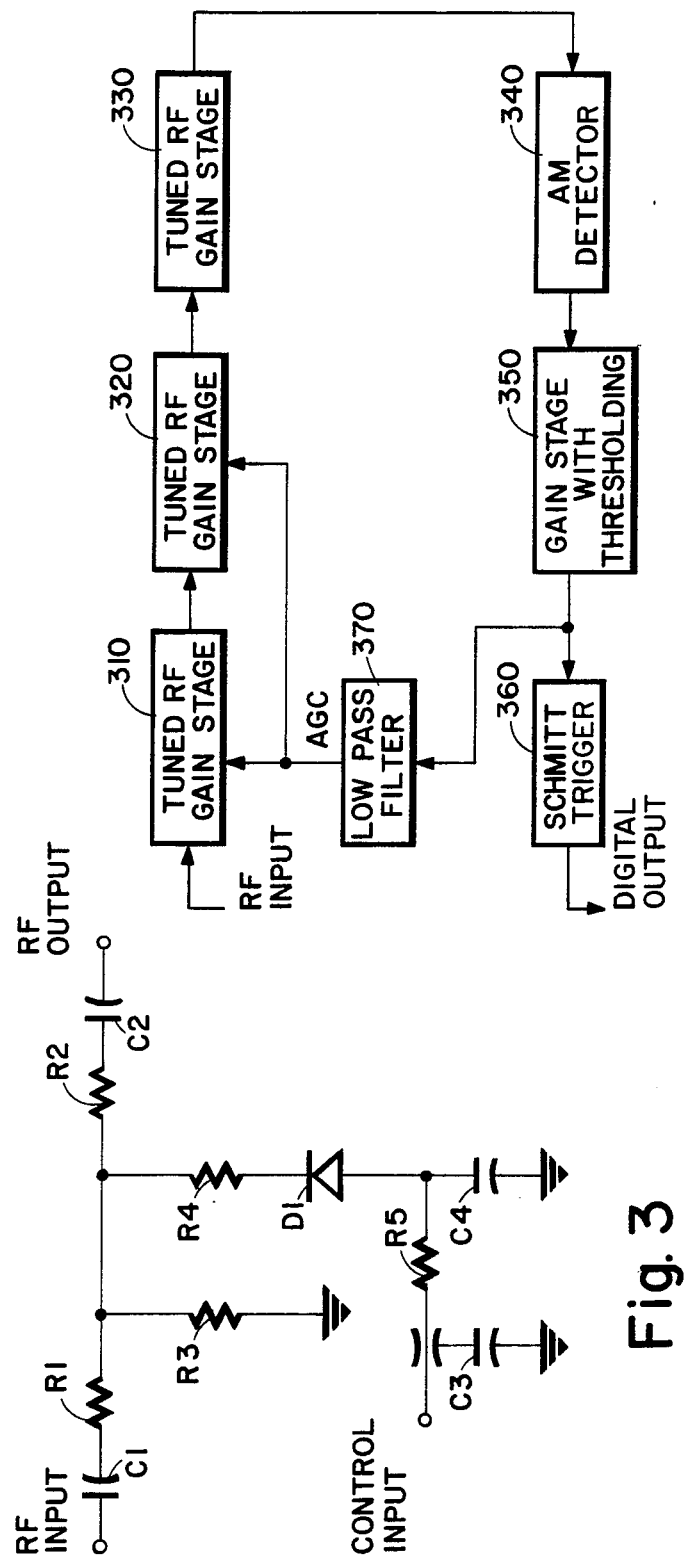

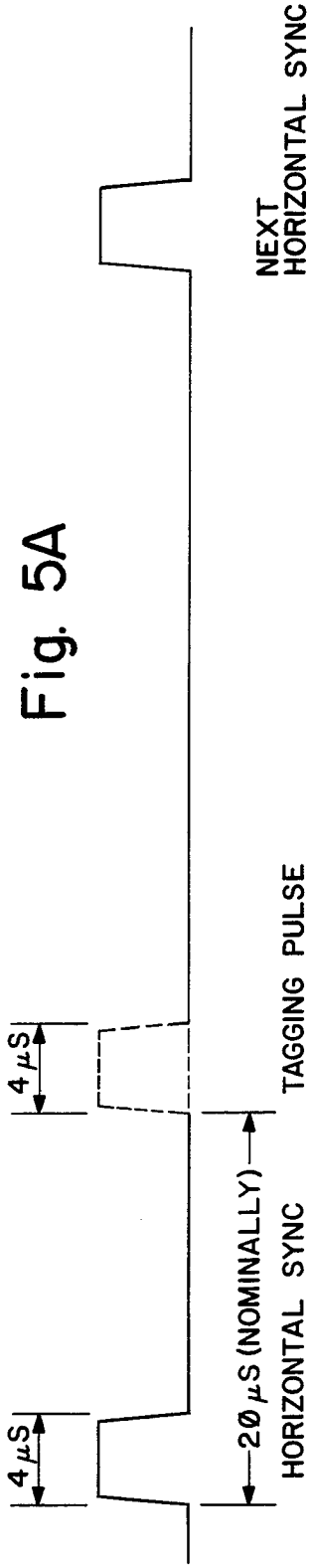

Fig. 5A

HORIZONTAL SYNC RECOVERY PULSES ARE TRANSMITTED ONLY DURING THE VISIBLE PORTION OF THE FIELD. TAGGING PULSE SAMPLING OCCURS ONLY AFTER THE FIRST EIGHT HORIZONTAL SYNC RECOVERY PULSES.

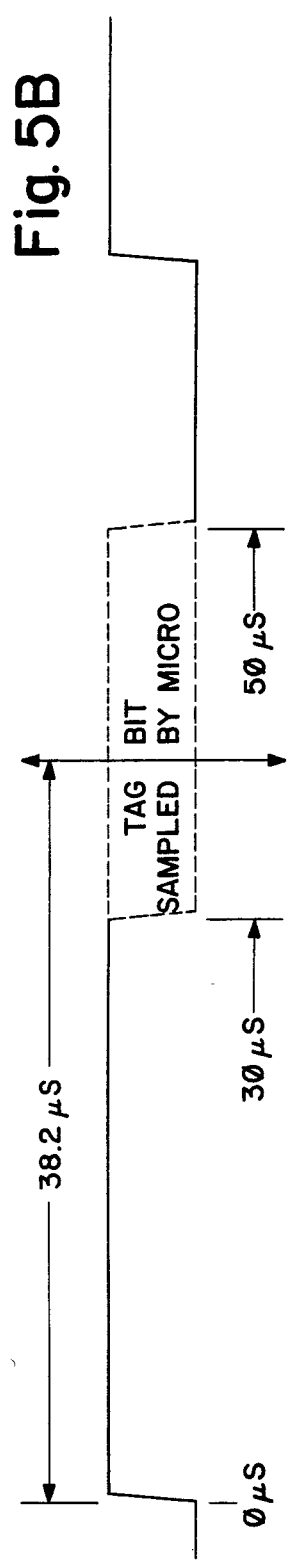

Fig. 5B

PULSES INPUT TO MICROPROCESSOR ARE STRETCHED TO 30 μS BY RETRIGGERABLE ONE-SHOT. IF TAGGING PULSES ARE PRESENT, "I" LEVEL IS APPLIED TO MICRO INPUT FOR 50 μS (NOMINAL). IF TAGGING PULSES ARE ABSENT, "I" LEVEL IS APPLIED TO MICRO INPUT FOR 30 μS. MICROPROCESSOR SAMPLES INPUT AT 38.2 μS (NOMINAL) FROM LEADING EDGE OF HORIZONTAL SYNC RECOVERY PULSE.

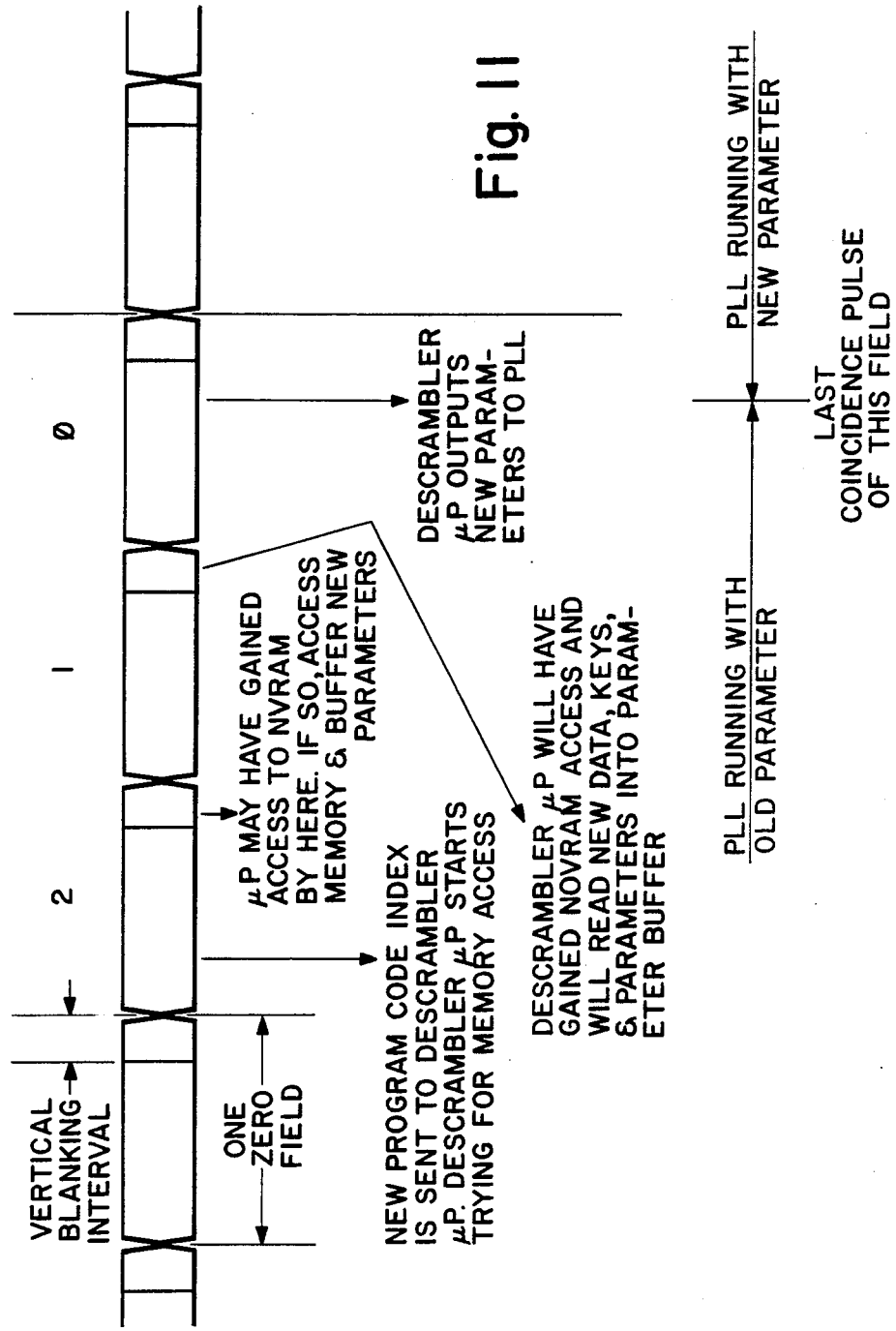

METHOD AND APPARATUS FOR SCRAMBLING AND DESCRAMBLING TELEVISION PROGRAMS

BACKGROUND OF THE INVENTION

The invention relates to CATV systems, and more particularly, to CATV systems in which one or more programs are additionally supplied at a premium over those programs generally supplied.

CATV systems are known which provide various channel containing television programs for selective viewing by subscribers to the system. Of these various channels, one or more may be designated as premium channels for selective viewing by those subscribers who pay an additional amount for the privilege of viewing the programs on the premium channels. These programs may be in the form of first run movies, major sporting events, etc. Generally, these programs are scrambled at the cable supplier's head-end and subsequently descrambled at the paying subscriber's home in a device commonly referred to as a set-top converter.

One method of scrambling/descrambling the television programs involves suppressing the modulated TV signal during the horizontal and verticle blanking intervals making the synchronizing information contained in these intervals indiscernible to the receiving television set. Horizontal synchronization timing is then encoded by means of amplitude modulation on the audio subcarrier. An authorized descrambler then takes the horizontal synchronization timing off the audio signal, reshapes it, inserts vertical timing, and applies the resultant signal to an attenuating pad. The attenuating pad simply attenuates all of the incoming modulated TV signal except for those portions containing the horizontal and vertical synchronization information. The attenuating pad output then is a modulated TV signal with synchronization information at the proper signal amplitude with respect to the video information.

The problem then arises that unauthorized descramblers for the above system are easy to fabricate. Attempts have been made to further complicate the encoding of synchronizing information on the audio subcarrier but these attempts generally fail to achieve a much higher degree of security because frequency and phase components of the desired synchronizing information are still present. The above method also suffers from another weakness in that the encoding of the synchronizing information on the audio subcarrier is in a fixed fashion. Once the code is broken, it is broken for all time.

SUMMARY OF THE INVENTION

The object of the present invention is to provide a method for scrambling and descrambling television programs which effectively prevents the use of unauthorized descramblers.

The above object is achieved in a method for scrambling and descrambling television programs comprising the steps: suppressing the horizontal synchronizing pulse stream contained in the selected TV video signal; encoding the horizontal synchronizing pulse stream by multiplying the pulse frequency of the pulse stream by a quantity N/M, where N and M are integers, thereby generating a new synthesized pulse stream; encoding the synthesized pulse stream with in-channel data relating to the phase of the horizontal and vertical synchronizing pulses as well as data concerning the values for N and M; combining the encoded synthesized pulse stream with the television video signal in which the horizontal synchronizing pulses have been suppressed; transmitting the resultant TV video signal; and then, receiving the resultant TV video signal, separating the encoded synthesized pulse stream from the resultant TV video signal, decoding the encoded synthesized pulse stream to recover the in-channel data; regenerating the horizontal synchronizing pulse stream using the in-channel data and the synthesized pulse stream; and combining the regenerated horizontal synchronizing pulse stream with the TV video signal.

In order to provide increased security against unauthorized descramblers, the above method is further characterized in that it includes the steps of generating a plurality of sets of data, each set including a value each for N and M, and each set being identified by an index number; transmitting these sets of data on a separate digital data channel; and selecting one of the sets of data for the value of N and M to be used in encoding said synthesized pulse stream, the data concerning the values for N and M being the index number of the selected set of data.

DESCRIPTION OF THE DRAWINGS

With the above objects and advantages in mind, the subject invention will be described with reference to the accompanying drawings in which:

FIG. 1 is a block diagram of a set-top converter having the invention incorporated therein;

FIG. 2 is a block diagram of the descrambler portion of the converter shown in FIG. 1;

FIG. 3 is a schematic drawing of an attenuating pad;

FIG. 4 is a block diagram of the in-channel data detector;

FIGS. 5a and 5b show waveforms for a prior art method of scrambling/descrambling;

FIG. 11 shows a sample updating of the N/M scrambling parameters.

DESCRIPTION OF THE PREFERRED EMBODIMENTS

Figure 10:
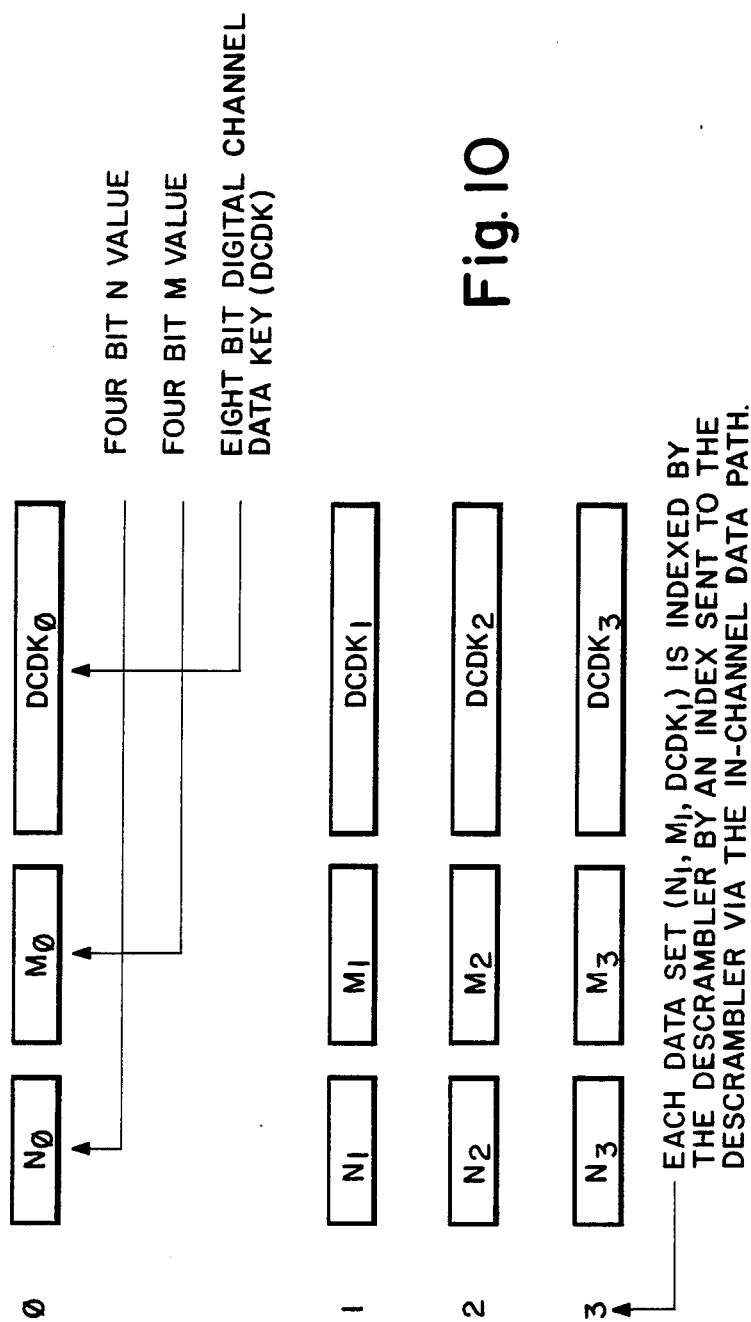
FIG. 10 shows the digital message to be sent over the digital data channel.

In general, the method of the present invention includes the generation of sets of data, each including an identifying index number, a value each for N and M, which are integers between 1 and 15, and a digital data key (see FIG. 10). These sets of data are stored at the supplier's head-end and are also transmitted over a separate digital data channel to the subscriber's converter for storage, to be used in the scrambling and descrambling TV programs. The method of scrambling then includes suppressing the horizontal and vertical synchronizing signals in the TV video signal of a selected TV program. The pulse frequency of the horizontal synchronizing signal is then multiplied by a factor N/M, the values for which being selected from one of the above sets of data, to generate a synthesized pulse stream. In-channel data is then generated and includes an in-channel data key, the index number of the set of data containing the values for N and M used in generating the synthesized pulse stream, a code representing the phase of the original horizontal synchronizing signals, and a code representing the phase of the original vertical synchronizing signals (see FIG. 8). To provide an even greater degree of security, the index number is encoded using the in-channel data key and the phase codes are encoded using the digital data key from the selected set of data. This encoding may be performed by combining the data to be encoded with the respective data key via the known EXCLUSIVE-OR process.

The synthesized pulse stream is then encoded with the encoded in-channel data by pulse width modulation, in which the trailing edges of the pulses in the synthesized pulse stream are varied in accordance with the in-channel data. The now encoded synthesized pulse stream is amplitude modulated on the audio signal subcarrier wave contained in the TV video signal in which the synchronizing signals have been suppressed. This resultant TV signal is then transmitted to the various subscribers.

In FIG. 1, there is shown a block diagram for a subscriber's set-top converter containing a descrambler in accordance with the invention. It should be noted that the ensuing description relates predominately to the descrambler of the invention, it being understood that the scrambler portion at the CATV supplier's head end is complementary thereto, the construction thereof being apparent given the configuration of the descrambler.

Referring to FIG. 1, the converter includes a tuner 100 for tuning the various channels supplied thereto by the subscriber's cable drop. The tuner 100 output then passes through a switchable RF attenuating pad 200 and on to the subscriber's TV receiver. The tuner 100 output is also applied to an in-channel data detector 300 which extracts, if any, the encoded synthesized pulse stream from the TV video signal. This encoded synthesized pulse stream is then processed in a descrambler 400 which generates a switching signal for the attenuating pad 200 using the information contained in the encoded synthesized pulse stream as well as data contained in a shared memory 500.

The converter further includes a control module 600 for controlling the tuner 100, which control module 600 is also coupled to the shared memory 500. A digital data receiver 700 is shown connected to the subscriber's cable drop for receiving messages sent over the digital data channel.

The type of converter being described is a one-way, addressable converter in which equipment at the supplier's head-end may individually communicate with the various converters over the digital data channel by using a unique code word, or address, which may be permanently stored in the memory 500. In the case of a two-way addressable system, the converter of FIG. 1 may also include a data transmitter 800, shown in dashed lines, connected to both the shared memory 500 and the subscriber's cable drop.

In FIG. 2, the descrambler 400 includes a descrambler microprocessor 410, a phase-locked loop 420 and a monostable multivibrator 430 which generates a 10 microsecond pulse. The microprocessor 410 receives the encoded synthesized pulse stream via an inverter 435 and decodes this pulse stream by examining the trailing edges of the pulses therein to recover the in-channel data. The microprocessor 410 then decodes the index number using the in-channel data key, obtains the relevant set of data from the memory 500, and decodes the phase codes using the digital data key. The values for N and M, along with the horizontal phase code, are applied to the phase-locked loop 420 which provides at its output a square wave having the frequency and the phase of the original horizontal synchronizing signals. This square wave is converted to a pulse train having 10 microsecond pulses by the multivibrator 430, the output of which, along with the vertical synchronizing phase from the microprocessor 410, is applied to a NORgate 440, whose output, in turn, is applied to the switching input of the attenuating pad 200.

The descrambler 400 shown in FIG. 2 is also capable of descrambling TV video signals scrambled in accordance with the prior art method described above. In this method, an eight-bit digital code in the form of the presence or absence of tagging pulses following each of the first eight horizontal synchronizing pulses in a given field, which pulses have been amplitude modulated on the audio sub-carrier wave, provides information concerning the premium, or tier, level of the TV program. This code is compared with an internally stored code, and if the converter is authorized, causes the converter to reinsert the horizontal synchronization information into the TV video signal. FIG. 5a shows the output of the in-channel data detector 300 when this type of scrambling is encountered. The output of the detector 300 is applied to a 30 microsecond monostable multivibrator 450. The output from the multivibrator 450 (FIG. 5b) is applied to the microprocessor 410 and to a controllable selector 460, to a second input of which the output of the phase-locked loop 420 is also applied. The output from the controllable selector 460 is then applied to the multivibrator 430. When the microprocessor 410 detects the presence of the tagging pulses, it ignores the output of the inverter 435, outputs a switching signal to the controllable selector 460, and then, if the converter is authorized, outputs the vertical synchronizing phase to the NORgate 440.

FIG. 3 shows an embodiment of the switchable attenuating pad 200. The output from the tuner 100 is applied through a capacitor C1 to a voltage divider comprising resistors R1 and R3. The signal at the junction of resistors R1 and R3 passes through a resistor R2 and a capacitor C2 to the output of the attenuating pad 200. The control input of the attenuating pad 200 is coupled to ground by a capacitor C3 and is applied to a resistor R5. The other side of resistor R5 is connected to ground by a capacitor C4 and to the above junction of resistors R1 and R3 by a series combination of a diode D1 and a resistor R4. The presence of, for example, 5 volts on the control input, causes the attenuating pad 200 to antenuate the signal at its input by 6 DB, while the absence of a control signal causes the attenuating pad 200 to pass the input signal intact.

FIG. 4 shows an embodiment for the in-channel data detector 300. The tuner 100 output is applied to a series arrangement of 3 tuned RF gain stages 310, 320 and 330 which are tuned to the frequency of the audio signal subcarrier wave. The output from the RF gain stages is applied to an AM detector 340 for demodulating the encoded synthesized pulse stream modulated on the subcarrier wave. The output from the AM detector 340 is amplified and thresholded in gain stage 350 and shaped in Schmidt trigger 360. The output of the gain stage 350 is also applied to a low-pass filter 370, the output of which is used as an automatic gain control for the tuned RF gain stages 310 and 320.

Figure 6:
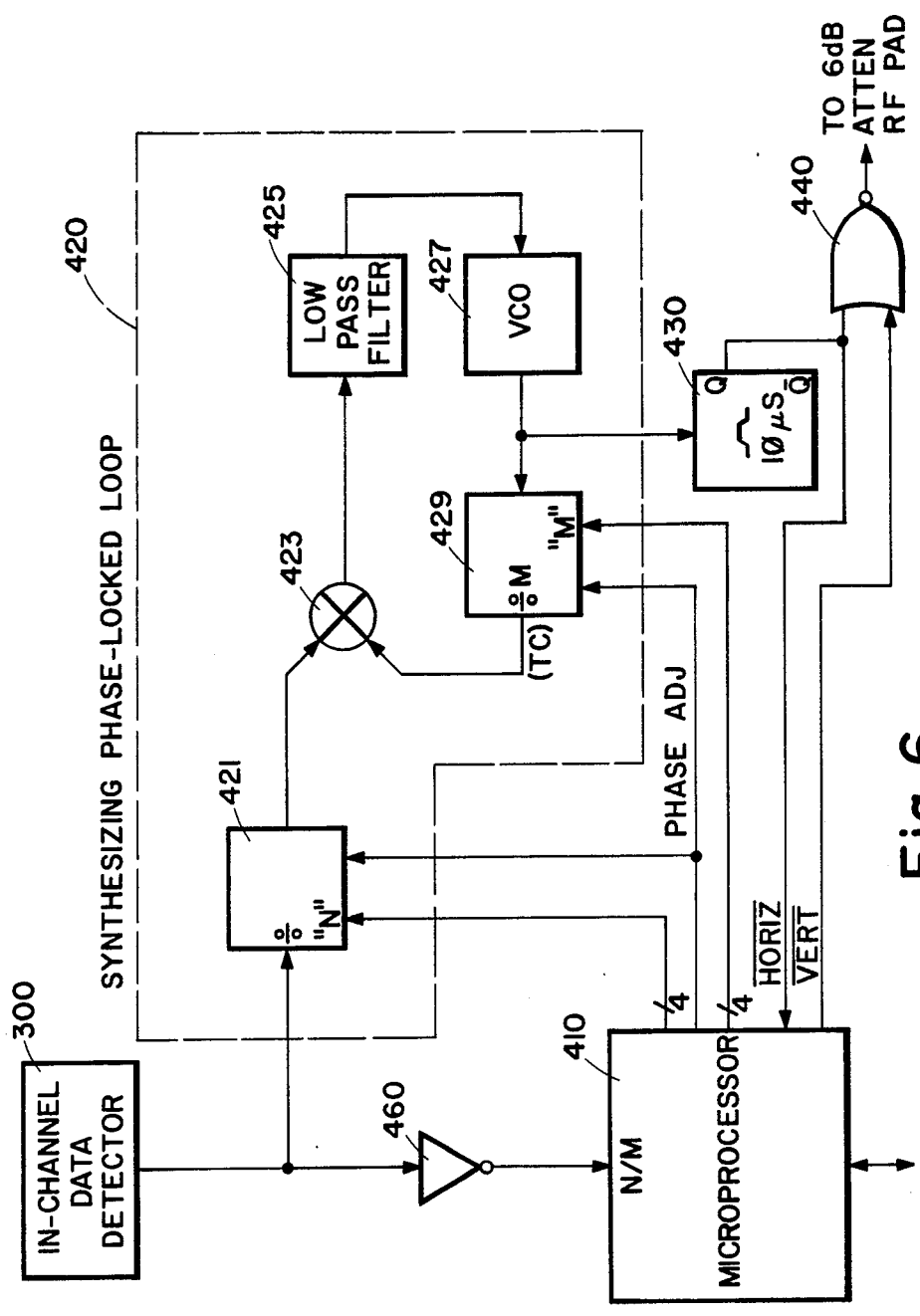
FIG. 6 shows a detailed block diagram of the synthesizing phase locked loop of the descrambler shown in FIG. 2.

An embodiment of the phase-locked loop 420 is shown in FIG. 6. The output of the in-channel data detector 300 is applied to the dividing input of a programmable divider 421, the dividing factor N being provided by the microprocessor 410. The output from the divider 421 is applied to one input of a phase sensitive detector 423, the output from which being applied via a low-pass filter 425 to the control input of a voltage controlled oscillator 427. The output of the oscillator 427 is applied to a second programmable divider 429, the dividing factor M being provided by the microprocessor 410, and the output thereof is applied to the second input of the phase sensitive detector 423. This arrangement effectively multiplies the in-channel data detector 300 output by M/N and, assuming that the values for M and N are correct, the output of the oscillator 427 is at the frequency of the original horizontal synchronizing signal. In order to achieve the proper phase of this signal, the horizontal phase code from the microprocessor 410 is applied to the resetting inputs of the dividers 421 and 429.

Figure 7:
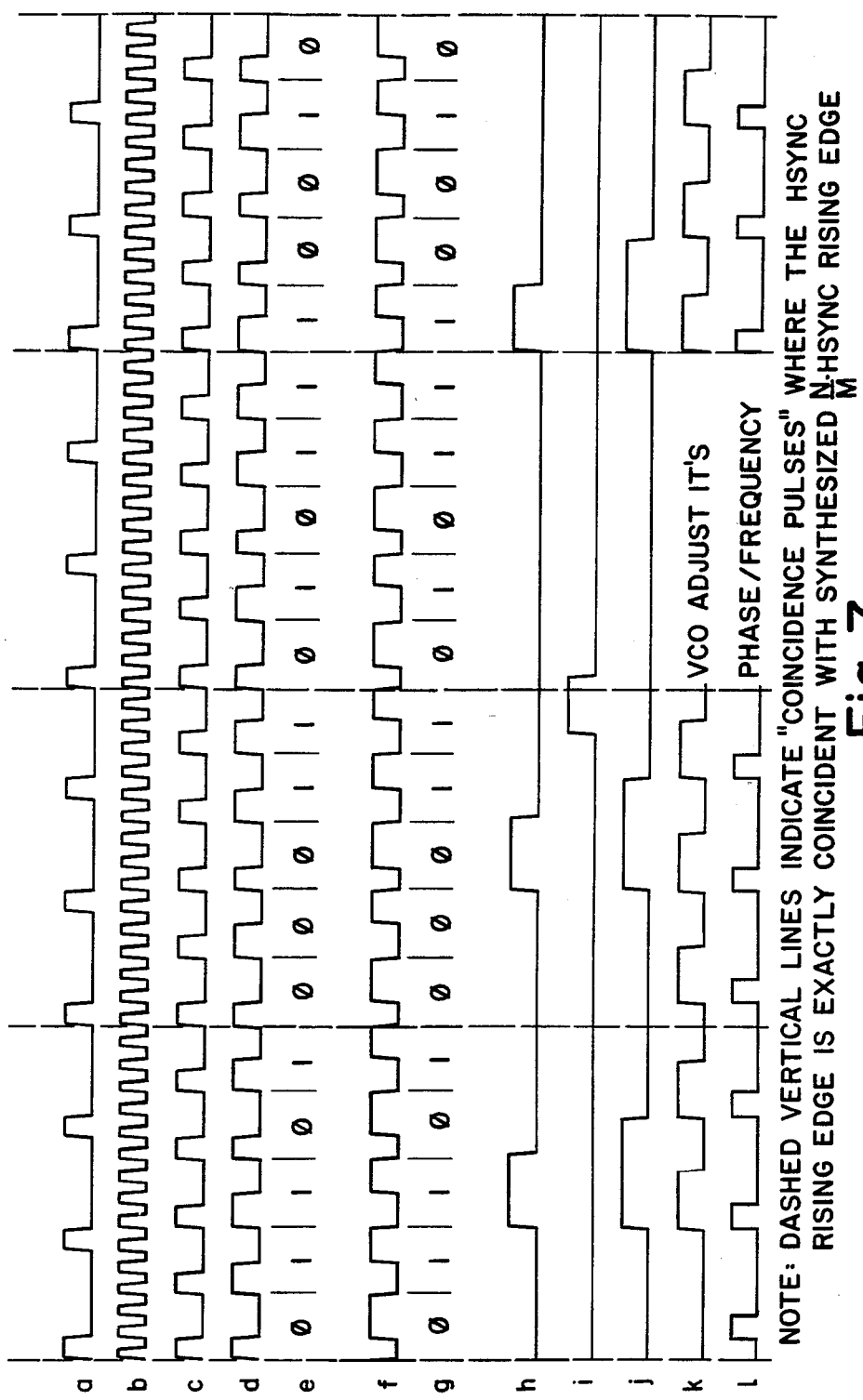
FIG. 7 shows various waveforms occurring in the invention.

FIG. 7 shows a series of waveforms typical in the disclosed invention. Waveform a represents the original horizontal synchronizing pulse stream, waveform b represents the waveform a multiplied by N, while waveform c represents the waveform b divided by M. The encoded synthesized pulse stream is represented by waveform b, while the encoding data is shown at e. Referring to FIG. 6, the input to microprocessor 410 is represented by waveform f, the actual data again being shown at g. The output of the divider 421 is represented by waveform h, the resetting output from the microprocessor 410 is shown by waveform i, while the output of divider 429 is shown by waveform j. Finally, the oscillator 427 output is shown by waveform k and the output of the multivibrator 430 is shown by wave-form 1.

Figure 8:
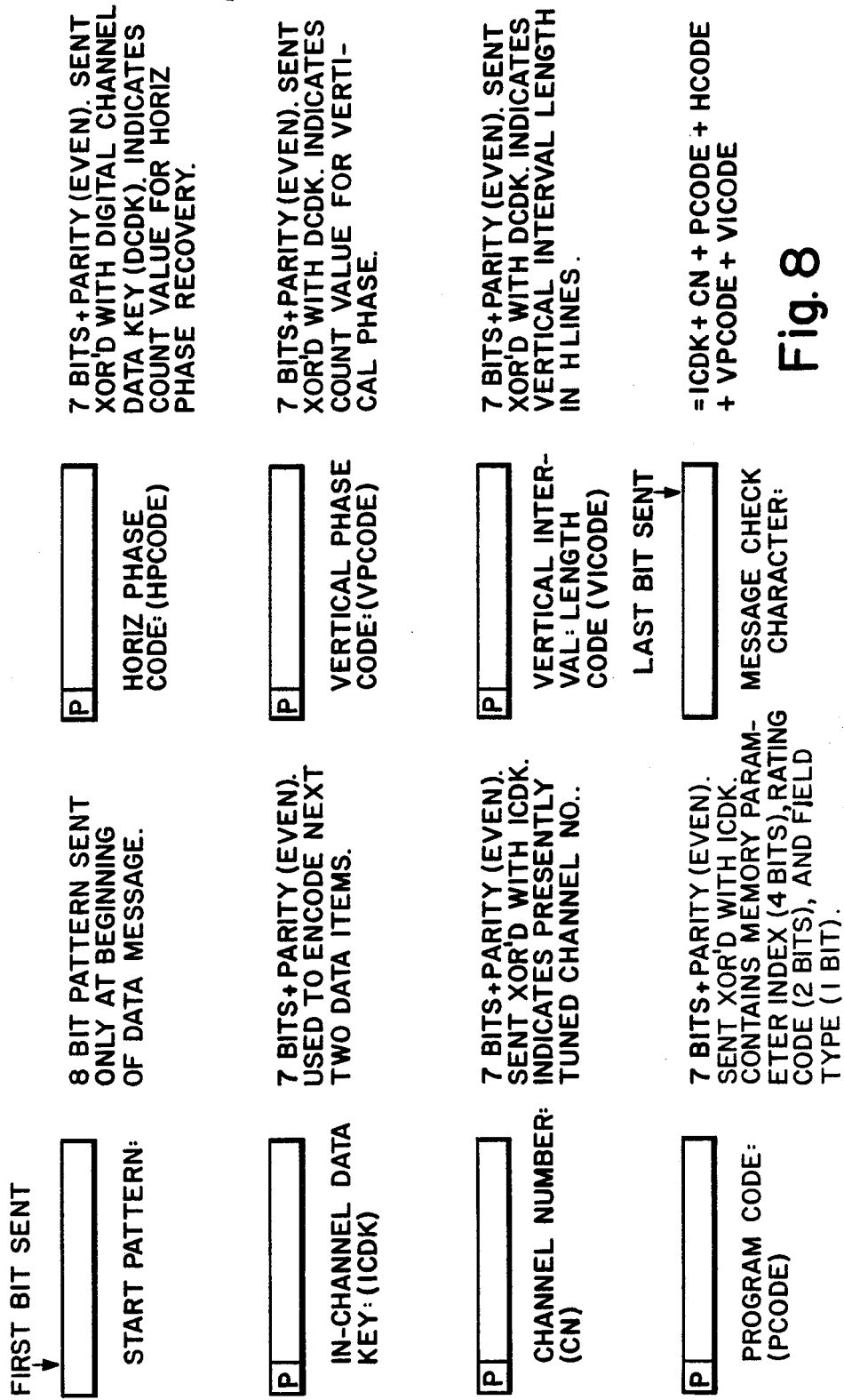
FIG. 8 shows the in-channel data message format.
Figure 9A:
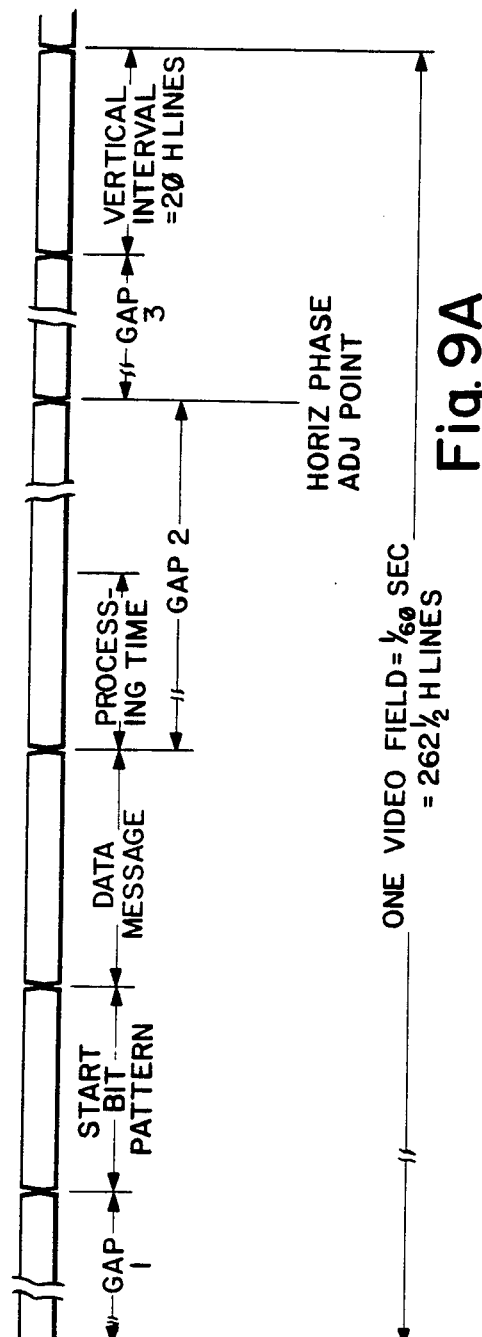
FIG. 9a shows the time positioning of the in-channel data message in, for example, a video field.
Figure 9B:
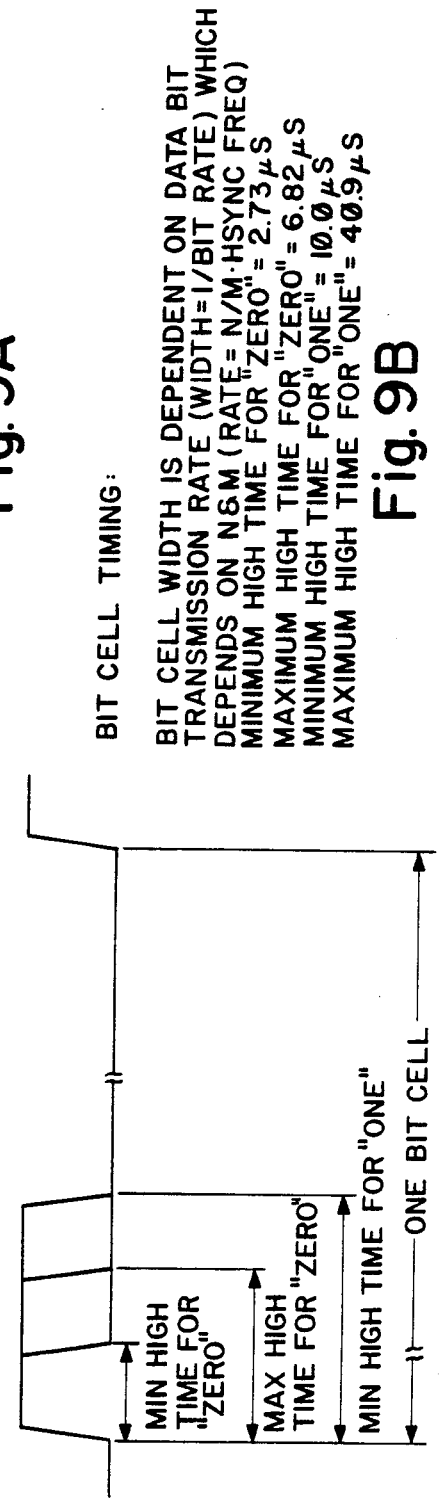
FIG. 9b shows the bit cell timing for the encoding of the synthesized pulse stream.

FIG. 8 shows, as an example, the contents of the in-channel data message. The channel number may be checked with a number stored in the memory 500 to ascertain if the converter is authorized to receive that particular channel. The program code, which contains the index number, may also include information concerning the rating code (G, PG, R, X) of the TV program which can enable the subscriber, through the use of a parental code, to control access by children to certain programs.

FIG. 11 shows the sequence of events which occur when the cable supplier decides to use a different set of data from the previously generated sets that were digitally transmitted to the converters.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

We claim:

1. A method for scrambling and descrambling television programs, in which selected television programs, in the form of composite TV video signals having a stream of horizontal synchronizing pulses therein, are scrambled at the transmission end and then descrambled, when authorized, at the receiving end; the method comprising the steps:
   suppressing the horizontal synchronizing pulse stream contained in the selected TV video signal;
   encoding said horizontal synchronizing pulse stream by multiplying the pulse frequency of said pulse stream by a quantity N/M, where N and M are integers, thereby generating a new synthesized pulse stream;
   encoding said synthesized pulse stream with in-channel data relating to the phase of the horizontal and vertical synchronizing pulses as well as data concerning the values for N and M;
   combining said encoded synthesized pulse stream with said TV video signal in which the horizontal synchronizing pulses have been suppressed;
   transmitting the resultant TV video signal; and then
   receiving said resultant TV signal;
   separating said encoded synthesized pulse stream from said resultant TV video signal;
   decoding said encoded synthesized pulse stream to recover said in-channel data;
   regenerating said horizontal synchronizing pulse stream using said in-channel data and said synthesized pulse stream; and
   combining said regenerated horizontal synchronizing pulse stream with said TV video signal.

2. The method as set forth in claim 1, characterized in that the step of combining said encoded synthesized pulse stream with said TV video signal comprises amplitude modulating said encoded synthesized pulse stream onto an audio signal subcarrier wave contained in said TV video signal, and said step of separating said encoded synthesized pulse stream from said resultant TV video signal comprises detecting said audio signal subcarrier wave in said resultant TV video signal and amplitude demodulating said subcarrier wave to recover said encoded synthesized pulse stream.

3. The method as set forth in claim 1, characterized in that the encoding of said synthesized pulse stream comprises varying the trailing edges of the pulses in said synthesized pulse stream in dependence on said in-channel data, and the decoding of said encoded synthesized pulse stream comprises examining the trailing edges of the pulses in said encoded synthesized pulse stream and extracting the in-channel data therefrom.

4. The method as set forth in claim 1, characterized in that said method further comprises, prior to the encoding of said horizontal synchronizing pulse stream, the steps:
   generating a plurality of sets of data, each set including a value each for N and M, and each set being identified by an index number;
   transmitting said sets of data on a separate digital data channel; and
   selecting one of said sets of data for the value of N and M to be used in encoding said synthesized pulse stream; said data concerning the values for N and M comprising the index number of the selected set of data; and, prior to regenerating said horizontal synchronizing pulse stream, the step:
   receiving and storing said plurality of sets of data, each set being identified by said index number.

5. The method as set forth in claim 4, characterized in that each set of data further includes a digital data key, and said in-channel data further includes an in-channel data key; said encoding of said synthesized pulse stream further comprising:
  encoding at least said data concerning the values for N and M with said in-channel data key; and
  encoding at least the phase of the horizontal and vertical synchronizing pulses with said digital data key.

6. Apparatus for scrambling and descrambling television programs, in which selected television programs, in the form of composite TV video signals having a stream of horizontal synchronizing pulses therein, are scrambled at the transmission end and then descrambled, when authorized, at the receiving end; said apparatus comprising:
  means for suppressing the horizontal synchronizing pulse stream contained in the selected TV video signal;
  means for encoding said horizontal synchronizing pulse stream, including means for multiplying the pulse frequency of said pulse stream by a quantity N/M, where N and M are integers, thereby generating a new synthesized pulse stream;
  means for encoding said synthesized pulse stream with in-channel data relating to the phase of the horizontal and vertical synchronizing pulses as well as data concerning the values for N and M;
  means for combining said encoded synthesized pulse stream with said TV video signal in which said horizontal synchronizing pulse stream has been suppressed;
  means for transmitting the resultant TV video signal; and then,
  means for receiving said resultant TV video signal;
  means for separating said encoded synthesized pulse stream from said resultant TV video signal;
  means for decoding said encoded synthesized pulse stream to recover said in-channel data;
  means for regenerating said horizontal synchronizing pulse stream using said in-channel data and said synthesized pulse stream; and
  means for combining said regenerated horizontal synchronizing pulse stream with said TV video signal.

7. The apparatus as claimed in claim 6, characterized in that said means for combining said encoded synthesized pulse stream with said TV video signal comprises means for amplitude modulating said encoded synthesized pulse stream onto an audio signal subcarrier wave contained in said TV video signal, and said means for separating said encoded synthesized pulse stream from said resultant TV video signal comprises means for detecting said audio signal subcarrier wave in said resultant TV video signal and means for amplitude demodulating said subcarrier wave to recover said encoded synthesized pulse stream.

8. The apparatus as set forth in claims 6, characterized in that said means for encoding said synthesized pulse stream comprises means for varying the trailing edges of the pulses in said synthesized pulse stream in dependence on said in-channel data, and said means for decoding said encoded synthesized pulse stream comprises means for examining the trailing edges of the pulses in said encoded synthesized pulse stream and for extracting the in-channel data therefrom.

9. The apparatus as set forth in claim 6, characterized in that said apparatus further comprise means for generating and storing a plurality of sets of data, each set including a value each for N and M and an identifying index number; means for transmitting said sets of data on a separate digital data channel; means for selecting one of said sets of data for the values of N and M to be used in said means for encoding said synthesized pulse stream; said data concerning the values for N and M comprising the index number of the selected set of data; and means for receiving and storing said plurality of sets of data having been transmitted over said separate digital data channel.

10. The apparatus as set forth in claim 9, characterized in that each of said sets of data further includes an in-channel data key; said means for encoding said synthesized pulse stream further comprising means for encoding at least said data concerning the values for N and M with said in-channel data key; and means for encoding at least the phase of the horizontal and vertical synchronizing pulses with said digital data key.

11. Apparatus for scrambling television programs, in which selected television programs, in the form of composite TV video signals having a stream of horizontal synchronizing pulses therein, are scrambled at the transmission end and then descrambled, when authorized, at the receiving end; said apparatus comprising:
  means for suppressing the horizontal synchronizing pulse stream contained in the selected TV video signal;
  means for encoding said horizontal synchronizing pulse stream, including means for multiplying the pulse frequency of said pulse stream by a quantity N/M, where N and M are integers, thereby generating a new synthesized pulse stream;
  means for encoding said synthesized pulse stream with in-channel data relating to the phase of the horizontal and vertical synchronizing pulses as well as data concerning the values for N and M; and
  means for combining said encoded synthesized pulse stream with said TV video signal in which said horizontal synchronizing pulse stream has been suppressed.

12. The apparats as set forth in claim 11, characterized in that said means for combining said encoded synthesized pulse stream with said TV video signal comprises means for amplitude modulating said encoded synthesized pulse stream onto an audio signal subcarrier wave contained in said TV video signal.

13. The apparatus as set forth in claim 11, characterized in that said means for encoding said synthesized pulse stream comprises means for varying the trailing edges of the pulses in said synthesized pulse stream in dependence on said in-channel data.

14. The apparatus as set forth in claim 11, characterized in that said apparatus further comprises means for generating and storing a plurality of sets of data, each set including a value each for N and M and an identifying index number; means for transmitting said sets of data on a separate digital data channel; and means for selecting one of said sets of data for the values of N and M to be used in said means for encoding said synthesized pulse stream, said data concerning the values for N and M comprising the index number of the selected set of data.

15. The apparatus as set forth in claim 14, characterized in that each of said sets of data further includes a digital data key and said in-channel data further includes an in-channel data key; said means for encoding said synthesized pulse stream further comprising means for encoding at least said data concerning the values for N and M with said in-channel data key; and means for encoding at least the phase of the horizontal and vertical synchronizing pulses with said digital data key.

16. Apparatus for descrambling television programs, which programs, in the form of composite TV video signals, have been scrambled by having the horizontal synchronizing pulse stream contained therein suppressed and by combining therewith an encoded synthesized pulse stream which is formed by multiplying the pulse frequency of the horizontal synchronizing pulse stream by a factor N/M, N and M being integers, and by encoding the synthesized pulse stream with in-channel data including data concerning the values for N and M as well as the phase of the horizontal and vertical synchronizing pulses; characterized in that the apparatus comprises:

means for separating said encoded synthesized pulse stream from the scrambled TV video signal;

means for recovering said in-channel data from said encoded synthesized pulse stream; and means for regenerating said horizontal synchronizing pulse stream using said in-channel data and said synthesized pulse stream.

17. The apparatus as set forth in claim 16 wherein the encoded synthesized pulse stream is combined with the TV video signal by amplitude modulating said encoded synthesized pulse stream on an audio signal subcarrier wave contained in the TV video signal; characterized in that the separating means comprises means for detecting said audio signal subcarrier wave and means for amplitude demodulating said subcarrier wave to recover said encoded synthesized pulse stream.

18. The apparatus as set forth in claim 16, wherein said synthesized pulse stream is encoded by varying the trailing edge of the pulses therein in accordance with the in-channel data; characterized in that said recovering means comprises means for examining the trailing edges of the pulses in said encoded synthesized pulse stream and for extracting the in-channel data therefrom.

19. The apparatus as set forth in claim 16, wherein a plurality of sets of data, each set including a value each for N and M and an identifying index number, are transmitted on a separate digital data channel, and wherein one of these sets are chosen to provide the values for N and M, said data concerning the values for N and M being said index number; characterized in that said apparatus further comprises means for receiving and storing said plurality of sets of data.

20. The apparatus as set forth in claim 19, wherein each of the sets of data includes a digital data key, said in-channel data includes an in-channel data key and at least said data concerning the values for N and M and the phase of the horizontal and vertical synchronizing pulses are encoded by said in channel data key and said digital data key, respectively; characterized in that said means for regenerating said horizontal synchroninzing pulse stream comprises means for decoding said data concerning the values for N and M using said in-channel data key; means for retrieving the proper digital data key from said receiving and storing means; and means for decoding the phase of said horizontal and vertical synchronizing pulses use said digital data key.

* * * * *